United States Patent
Toraille et al.

(10) Patent No.: US 9,797,754 B2
(45) Date of Patent: Oct. 24, 2017

(54) ROBUST OPTICAL ENCODER

(71) Applicant: THALES, Courbevoie (FR)

(72) Inventors: Vincent Toraille, Vendome (FR); Jacques Bellon, Vendome (FR)

(73) Assignee: THALES, Courbevoie (FR)

( * ) Notice: Subject to any disclaimer, the term of this patent is extended or adjusted under 35 U.S.C. 154(b) by 188 days.

(21) Appl. No.: 14/971,975

(22) Filed: Dec. 16, 2015

(65) Prior Publication Data

US 2016/0178404 A1   Jun. 23, 2016

(30) Foreign Application Priority Data

Dec. 17, 2014   (FR) ..................................... 14 02877

(51) Int. Cl.
  *G01D 5/34*    (2006.01)
  *G01D 5/347*   (2006.01)

(52) U.S. Cl.
  CPC ....... *G01D 5/3473* (2013.01); *G01D 5/34723* (2013.01)

(58) Field of Classification Search
  CPC .......................... G01D 5/3473; G01D 5/34723
  See application file for complete search history.

(56) References Cited

U.S. PATENT DOCUMENTS

| | | |
|---|---|---|
| 5,283,434 A | 2/1994 | Ishizuka et al. |
| 5,742,391 A | 4/1998 | Kaneda et al. |
| 2009/0122323 A1 | 5/2009 | Schneider |
| 2010/0163716 A1* | 7/2010 | Villaret ................ G01D 5/3473 250/227.28 |
| 2010/0171028 A1 | 7/2010 | Wong et al. |
| 2011/0272566 A1 | 11/2011 | Lippuner |

* cited by examiner

*Primary Examiner* — Tony Ko
(74) *Attorney, Agent, or Firm* — Baker & Hostetler LLP

(57) ABSTRACT

An optical encoder for which improved robustness is sought comprises: a movable part bearing a scattering zone and an absorbing zone, a light emitter that is positioned to emit light radiation in the direction of the movable part, a sensor that is sensitive to the light emitted by the emitter, the sensor being positioned to detect light radiation that is reflected by the scattering zone, the movement of the movable part making it possible to place either the scattering zone or the absorbing zone on an optical path between the emitter and the sensor, and an optical waveguide that is transparent to the light radiation and that is passed through by the optical path.

13 Claims, 3 Drawing Sheets

ROBUST OPTICAL ENCODER

CROSS-REFERENCE TO RELATED APPLICATIONS

This application claims priority to foreign French patent application No. FR 1402877, filed on Dec. 17, 2014, the disclosure of which is incorporated by reference in its entirety.

FIELD OF THE INVENTION

The invention relates to an optical encoder for which improved robustness is sought, in particular in terms of electromagnetic compatibility.

BACKGROUND

Optical encoders are present in numerous electronic devices. They are employed to allow a user to input data. There exist, for example, rotary encoders comprising a rotating button driving a disk bearing alternating scattering and absorbing zones. The encoder also comprises a circuit board on which an emitter and a light sensor are positioned. The emitter, such as a light-emitting diode for example, emits light radiation in the direction of the disk. The sensor makes it possible to detect the light radiation when it is reflected by a scattering zone. It is thus possible to obtain, as output from the sensor, a binary signal that is representative of a reflection from a scattering zone, or of the absence of reflection when the light radiation strikes an absorbing zone.

A user manipulates the button in order to make the disk turn, thereby placing on the optical path between the emitter and the sensor either a scattering zone or an absorbing zone.

The protection of an electronic device from electromagnetic interference is always tricky to achieve. The use of metal walls that are electrically connected to a ground makes it possible to produce a shielding screen that isolates the device from its electromagnetic environment. However, when the device comprises movable portions such as those used to input of data into an encoder, the shielding screen is interrupted in order to allow for the passage of a movable part between the interior of the device, where, for example, a printed circuit board might be found, and the exterior of the device, where the movable part forms a member that is manipulated by a user.

SUMMARY OF THE INVENTION

The invention provides a solution to this problem by providing an optical encoder in which it is easy to place a continuous shielding screen between the movable part of the encoder and the electronic portion where the sensor is located.

To this end, one subject of the invention is an optical encoder comprising:
  a movable part bearing a scattering zone and an absorbing zone,
  a light emitter that is positioned so as to emit light radiation in the direction of the movable part,
  a sensor that is sensitive to the light emitted by the emitter, the sensor being positioned so as to detect light radiation that is reflected by the scattering zone, the movement of the movable part making it possible to place either the scattering zone or the absorbing zone on an optical path between the emitter and the sensor,
  an optical waveguide having a first and a second external face, the light emitter being positioned so as to emit the light radiation into the waveguide, the light radiation being able to totally reflect between the first face and the second face, the optical waveguide being positioned between the movable part and the sensor, the movable part being positioned on the side of the first face, the sensor being positioned on the side of the second face, the first face comprising a first altered zone that is configured so that a portion of the light radiation exits the waveguide via the altered zone in the direction of the movable part, the optical waveguide being passed through by the light radiation that is reflected by the scattering zone.

The presence of the optical waveguide already makes it possible to physically isolate the movable part from the sensor, for example in order to protect the sensor from dust. The isolation may also be electromagnetic and to this end the optical encoder comprises an electrical shielding screen that is positioned on the face of the plate, the electrical shielding screen being transparent to the light radiation.

The optical encoder may comprise at least one shield making it possible to protect the sensor from stray radiation not originating from the movable part.

The shield may be formed by a mask that is opaque to the light radiation, the mask shielding the plate with the exception of a hole made facing the sensor.

The altered zone may comprise means for focusing the light radiation extracted via the face around a direction perpendicular to the plane of the waveguide.

The altered zone may be formed by local geometric splitting of the first face, the local geometric split disrupting the total reflection of the light radiation in the waveguide.

The first face of the waveguide may comprise a second altered zone that is separate from the first altered zone so that a portion of the light radiation exits the waveguide via the second altered zone so as to illuminate a legend that is associated with the movable part.

The emitter is called the first emitter. The encoder advantageously comprises a second light emitter that is positioned so as to emit light radiation into the waveguide, the first and the second light emitters each emitting in one wavelength band, the two bands being separate. The sensor is then configured to detect radiation in the wavelength band of the first emitter and the wavelength band of the second emitter is used to exit the waveguide via the second altered zone.

In one embodiment allowing the signal-to-noise ratio of a signal issued by the encoder to be improved, the optical encoder may comprise a second sensor, the second sensor being capable of detecting light radiation that is reflected by one of the zones of the movable part, the second sensor being positioned so that when one of the two sensors receives light radiation that is reflected by a scattering zone, the other of the two sensors is facing an absorbing zone and vice versa.

In another embodiment allowing for a redundancy in the information issued by the encoder, the optical encoder comprises a plurality of sensors that are positioned so that all of them are able to receive radiation that is reflected by one and the same scattering zone.

Advantageously, the optical encoder comprises a light source that is controlled by a signal issued by the sensor and allowing information to be fedback to the user depending on movements of the movable part.

The light source allowing the information to be fedback is positioned so as to emit light perpendicularly to the plate while passing therethrough.

The light source allowing the information to be fedback emits in a wavelength band that is separate from that for which the sensor is configured.

BRIEF DESCRIPTION OF THE DRAWINGS

The invention will be better understood and other advantages will become apparent upon reading the detailed description of one embodiment given by way of example, the description being illustrated by the appended drawing in which.

For the sake of clarity, the same elements bear the same references in the various figures.

DETAILED DESCRIPTION

Figure 1:
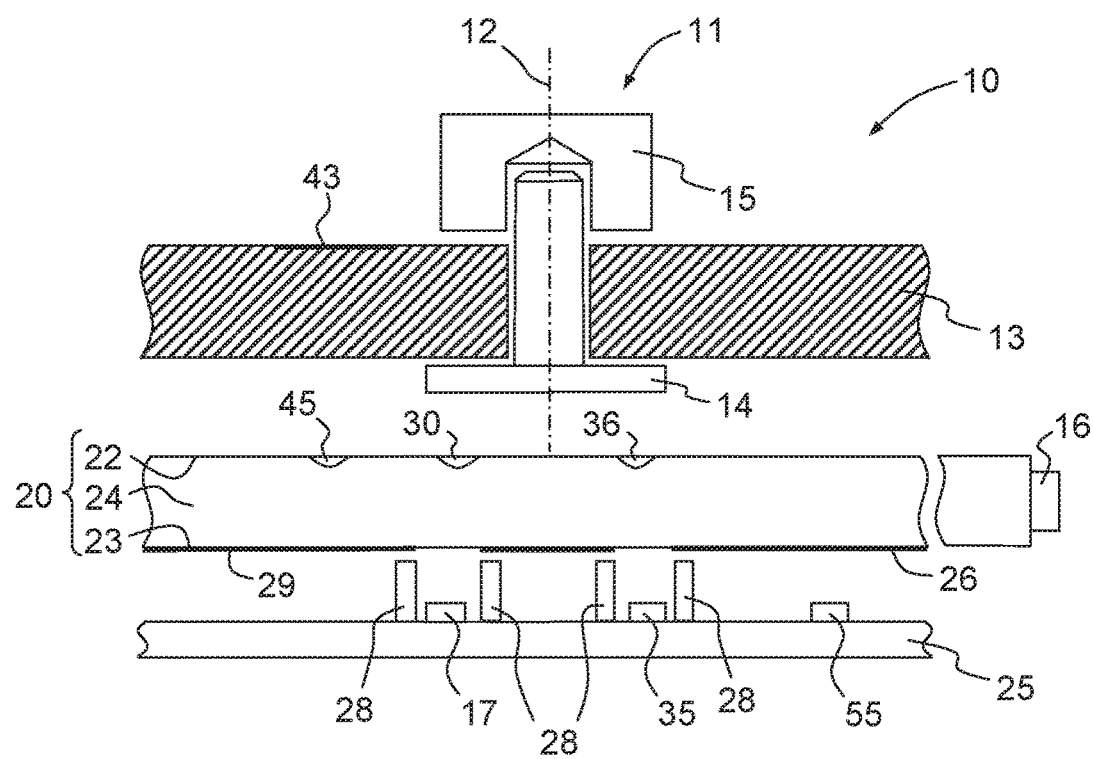
FIG. 1 shows a cross-sectional view of an exemplary optical encoder conforming to the invention.

FIG. 1 shows an optical encoder 10 comprising a movable part 11. In the example shown, the portion 11 is rotationally movable around an axis 12. Alternatively, the invention may be implemented in an optical encoder comprising a part that is translationally movable. The portion 11 is movable with respect to a holder 13. The movable part 11 comprises a disk 14 that is securely fastened to a button 15 that is intended to be manipulated by a user. The manipulation of the button 15 allows the user to input data. The holder 13 is, for example, a plate forming a wall of an electronic device to which the optical encoder 10 belongs. The button 15 is located on the outside of the holder 13 in order to be manipulated by the user, and the disk is located on the inside of the holder 13. The movable part 11, formed by the disk 14 and the button 15, is connected to the holder by an axial pivot linkage 12.

The optical encoder 10 comprises a light emitter 16 and a sensor 17 that is sensitive to the light radiation emitted by the emitter 16. The light emitter 16 is positioned so as to emit its light radiation in the direction of the movable part 11 and more specifically, in the direction of the disk 14.

Figure 2:
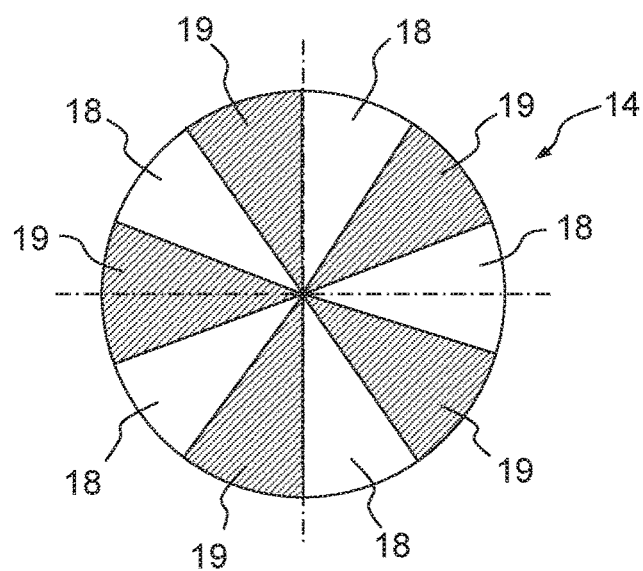
FIG. 2 shows a movable part of the optical encoder in FIG. 1.

FIG. 2 shows the disk 14 perpendicular to its axis of rotation 12. The disk 14 bears at least one scattering zone 18 and one absorbing zone 19. In the example shown, the disk 14 bears fives scattering zones 18 and five absorbing zones 19. The scattering 18 and absorbing 19 zones alternate. In practice, an optical encoder according to the invention may comprise a larger number of scattering and absorbing zones. Nonetheless, the invention may be implemented with a single scattering zone 18 and a single absorbing zone 19. In the example shown, the scattering 18 and absorbing 19 zones form, on the disk 14, angular sectors that are distributed around the axis 12.

The light emitter 16 is positioned so as to emit in the direction of the movable part 11, and the sensor 17 is positioned so as to detect light radiation that is reflected by one of the scattering zones 18. The rotation of the disk 14 makes it possible to place either a scattering zone 18 or an absorbing zone 19 on the optical path between the emitter 16 and the sensor 17.

According to the invention, the optical encoder comprises a plate 20 that is transparent to the light radiation originating from the emitter 16 and that is passed through by the optical path. More specifically, the plate 20 is positioned between the disk 14 and the sensor 17. The plate 20 separates the sensor 17 from the disk 14. The holder 13 is, for example, flat in the vicinity of the movable part 11. The plate 20 is, for example, parallel to the plane of the holder 13.

The sensor 17 may be positioned on a flat printed circuit board 25 that is parallel to the plate 20. The sensor 17 is, for example, a photodiode that is sensitive to the light radiation originating from the emitter 16 and, as the case may be, reflected by the disk 14. The sensor 17 forms a signal that is representative of the angular position of the movable part 11 with respect to the holder 13. In the case in which a photodiode is used as sensor, the representative signal is electrical and may be processed by other components that are positioned on the printed circuit board 25. The current issued by a photodiode may be processed by means of a current-to-voltage converter followed by an operational amplifier comparing the voltage generated by the converter to a threshold. At the output of the operational amplifier, a binary signal is available representing the angular position of the disk 14, with a scattering zone 18 on the optical path for one of the binary levels and an absorbing zone 19 on the optical path for the other binary level. Alternatively, other types of sensor may be implemented within the scope of the invention, such as, for example, a sensor delivering an optical signal.

Advantageously, the optical encoder 10 comprises an electrical shielding screen 26 positioned on the surface of the plate, the screen being transparent to the light radiation. The shielding screen may be positioned on one of the two faces of the plate 20, either on the disk 14 side or on the printed circuit board 25 side. The shielding screen 26 is, for example, produced by means of a transparent conductive electrode that is positioned on the plate 20. This electrode is, for example, made of tin-doped indium oxide, commonly known by the name ITO (indium tin oxide). Other technologies may be used to produce the shielding screen 26, such as, for example, the use of a transparent film incorporating a conductive mesh. This type of film is known in the literature by the name micro-mesh film. The shielding screen 20 advantageously covers the entire surface of the plate 20 and is connected to an electrical ground of the optical encoder 10, for example by way of the printed circuit board 25.

In order to prevent the sensor 17 from detect light radiation that does not originate from the disk 14, the optical encoder 10 may comprise at least one shield making it possible to protect the sensor 17 from stray radiation that does not originate from reflection from a scattering zone 18. A plurality of variant shields are shown in FIG. 1. The shield may be formed by a wall 28 that is positioned on the printed circuit 25 in the vicinity of sensor 17. It is also possible to make provision for a wall surrounding the sensor 17. The shield may also be formed by a mask 29 that is opaque to the light radiation issued by the emitter 16 and positioned on the surface of the plate 20 facing the printed circuit 25. The mask 29 may cover the entirety of the plate 20 with the exception of a, for example circular, hole that is centered on the location of the sensor 17.

La plate is formed by a flat optical waveguide 20. The emitter 16 is positioned so as to emit the light radiation into the waveguide 20. In the example shown, the emitter 16 is positioned on the edge face of the waveguide 20. The emitter 16 may alternatively be placed away from the waveguide 20. The waveguide 20 makes it possible to guide an electromagnetic wave, such as, for example, a light wave, in a central layer 24 that is limited by two external faces 22 and 23. The refractive index of the central layer 24 is higher than that of the surroundings in which the waveguide 20 is placed, such as air in particular. Thus, the wave propagating in the central layer 24 is totally reflected from the two external faces 22 and 23. The waveguide 20 is, for example, made of glass or of poly(methyl methacrylate), known by the acronym PMMA.

The first face 22 comprises a first altered zone 30 that is configured so that a portion of the light radiation exits the waveguide via the altered zone 30 in the direction of the movable part 14.

The altered zone may be produced by means of a scattering paint that is applied to the face 22. Advantageously, the altered zone comprises means for focusing the light extracted via the face 22 around a direction perpendicular to the plane of the waveguide 20. The focusing means are, for example, formed by a micro-prism film, commonly known in the literature by the name BEF (brightness enhancement film). The focusing means make it possible to guide the light extracted from the waveguide 20 toward the disk 14.

Alternatively, the altered zone 30 is formed by local geometric splitting of the first face 22, the geometric split disrupting the total reflection of the light radiation in the waveguide 20. This split may be produced recessed into the face 22. It be a question of including, in the face 22, a material with a refractive index that is different from that of the face 22.

In one advantageous embodiment, the optical encoder 10 comprises two sensors that are each associated with one zone of the disk. In FIG. 1, the first sensor bears the reference 17 and the second sensor bears the reference 35. The sensors 17 and 35 are positioned so that when one of the sensors receives light radiation that is reflected by a scattering zone 18, the other sensor is facing an absorbing zone 19 and vice versa. In other words, when one of the sensors is illuminated the other is not. The signals generated by the two sensors 17 and 35 are then opposite. It is possible to process the two signals differentially in order to improve the signal-to-noise ratio of the encoder 10.

Each of the sensors 17 and 35 may be associated with a particular emitter, for example positioned on the printed circuit board 25 in the vicinity of the corresponding sensor. When the plate 20 is formed by a flat waveguide, as shown in FIG. 1, the face 22 comprises a second altered zone 36 that is configured so that a portion of the light radiation exits the waveguide 20 via the altered zone 36 in the direction of the movable part 11 in order there to be, as the case may be, reflected toward the second sensor 35. The second altered zone 36 may be identical to the altered zone 30.

It is also possible to ensure redundancy in the signal issued by the optical encoder 10 by means of two sensors that are positioned so as to simultaneously detect a light radiation that is reflected by one and the same scattering zone 18 or by two separate scattering zones 18. The positioning of the two sensors is such that during a movement of the disk 14, the two sensors simultaneously detect either reflected light radiation or an absence of reflection.

In the above-described variants with one or more sensors, the scattering 18 and absorbing 19 zones are regularly positioned. The resolution of the optical encoder 10 is equal to the pitch of the scattering 18 and absorbing 19 zones. It is possible to increase the resolution of the optical encoder 10 by positioning at least two sensors that are able to face one and the same zone.

Figure 3A:
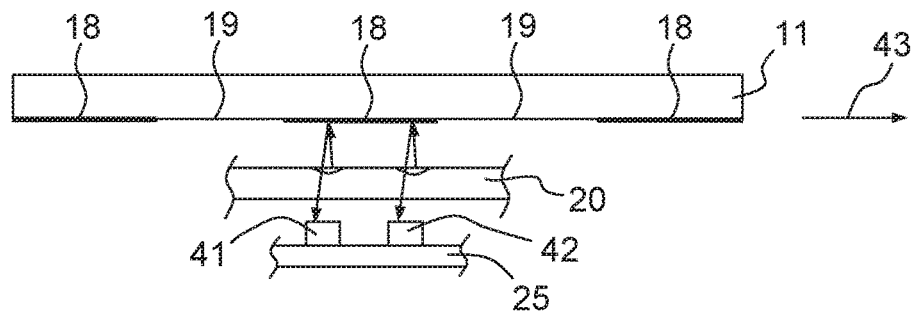
FIGS. 3a to 3d schematically show an encoder, with the movable part in various positions.
Figure 3B:
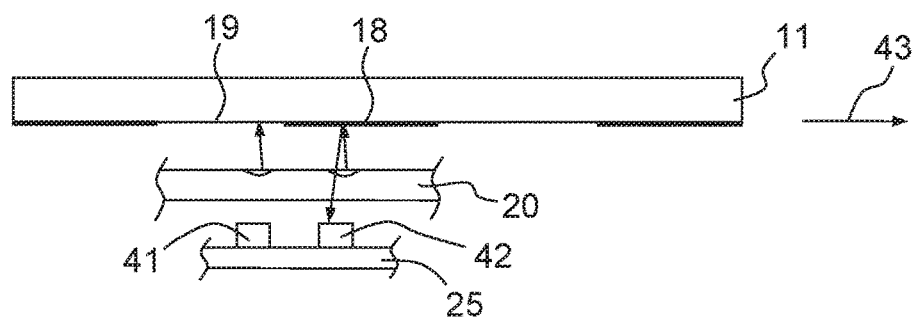
Figure 3C:
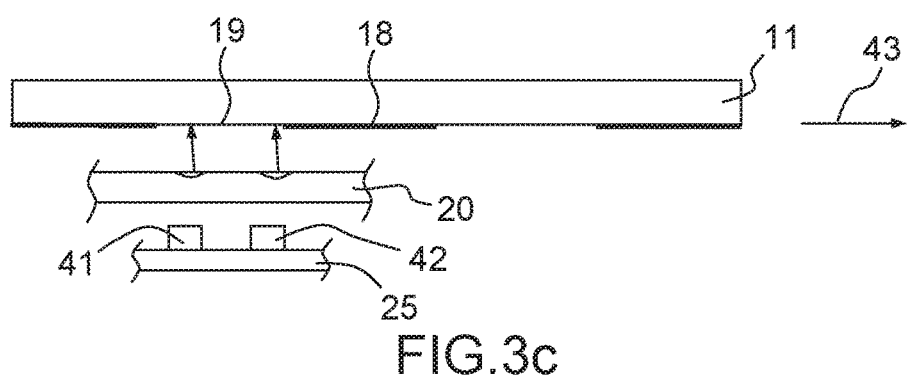
Figure 3D:
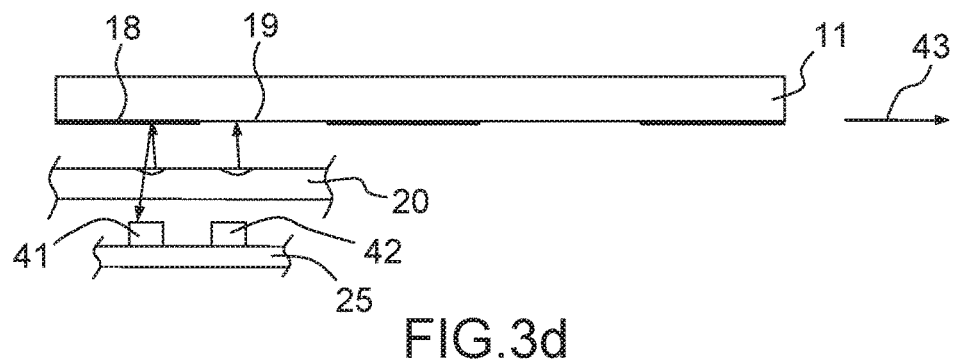

This variant is illustrated using FIGS. 3a to 3d. The movable part 11 is here able to move translationally. It is of course possible to exchange this representation for a rotational movement. Using two sensors 41 and 42, during a movement of the movable part 11 in a direction denoted by 43, it is possible, in succession, for the two sensors 41 and 42 to be illuminated, as illustrated in FIG. 3a; for the sensor 42 to be illuminated and the sensor 41 not to be illuminated, as illustrated in FIG. 3b; for the two sensors 41 and 42 not to be illuminated, as illustrated in FIG. 3c; and, finally, for the sensor 42 not to be illuminated and the sensor 41 to be illuminated, as illustrated in FIG. 3d. This arrangement makes it possible to double the resolution of the optical encoder and, more generally, to multiply the initial resolution given by the number of scattering 18 and absorbing 19 zones by the number of sensors that are capable of simultaneously detecting one and the same zone. This arrangement also makes it possible to determine the direction of the movement of the movable part 11 by comparing the signal variation in time.

When the plate 20 is formed by a waveguide, it is possible to use the waveguide to backlight the movable part 11 or its immediate environment, in particular to illuminate a legend 43 specifying, for example, the type of data that the user may input using the optical encoder 10. The legend may be a text and/or a symbol that is recognizable by the user. To this end, the first face 22 of the waveguide 20 comprises another altered zone 45 that is separate from the altered zone or zones 30 and 36 so that a portion of the light radiation exits the waveguide 20 via the altered zone 45 so as to illuminate the legend 43 that is associated with the movable part 11. This portion of the light radiation passes through the holder 13, which is transparent at least where the radiation passes through.

Figure 4:
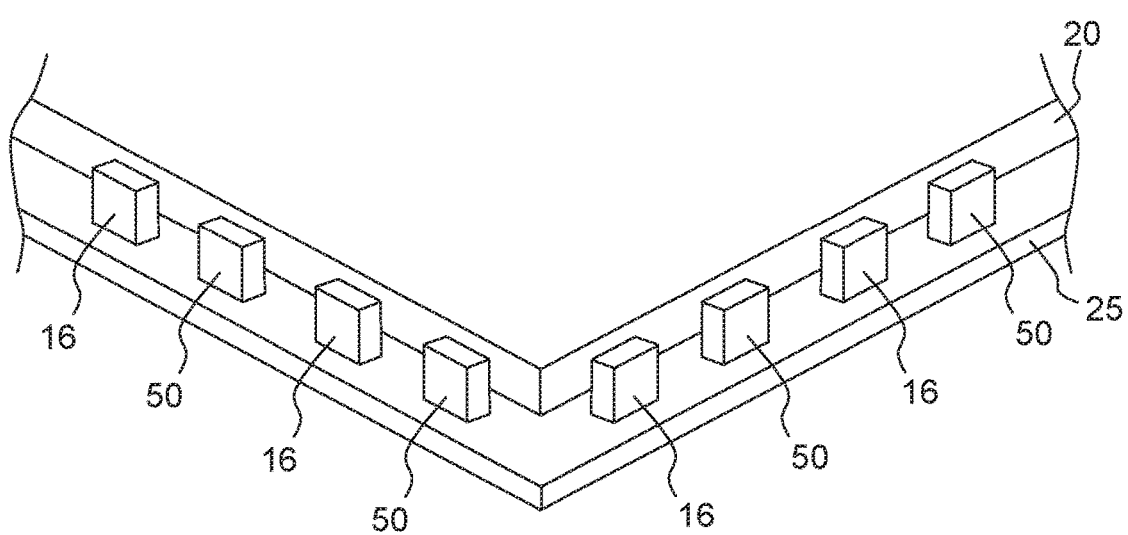
FIG. 4 shows a perspective view of a waveguide of the optical encoder.

FIG. 4 schematically shows a perspective view of an optical encoder 10. In this figure emitters are shown that make it possible to generate the light radiation that is propagated in the waveguide 20. The optical encoder 10 is flat and extends, for example, over a parallelepipedic area. The emitters may be formed from light-emitting diodes that are positioned on the perimeter of the waveguide 20 and that illuminate it via its edge face. The emitters may all be identical and all emit only at the same wavelength.

Alternatively, it is possible to differentiate the emitters depending on their use. More specifically, emitters of different wavelengths may be used for the optical encoding function and for the backlighting of the optical encoder 10. For example, diodes 16 emitting in an infrared band may be used for the optical encoding function and diodes 50 emitting in a visible wavelength band for the backlighting. The two types of diode are, for example, arranged alternately on the perimeter of the waveguide. The proportion of the diodes emitting in each of the bands is adapted depending on the need. Thus, the risk of interference between the backlighting and the optical encoding function is reduced. The sensor or sensors are also adapted to the detection of the wavelength band that is chosen for the diodes 16 provided for the optical encoding function. In FIG. 3, diodes 16 emit in the infrared and diodes 50 emit in a visible wavelength band.

The presence of the waveguide may advantageously be exploited to allow information to be fedback to the user depending on movements of the movable part 11. To this end, the optical encoder comprises a light source 55 that is controlled by a signal issued by the sensor or sensors. This light source 55 is activated depending on the rotation of the disk 14.

The light source 55 may be positioned so as to emit into the waveguide 20. The light source 55 is then positioned on the periphery of the waveguide 20 like the emitters 16 and 50. Alternatively, the light source 55 is positioned so as to emit light perpendicularly to the plate 20 (or the waveguide) while passing therethrough. This alternative is well suited to a multiple optical encoder having a plurality of separate movable parts 11 or to an encoder sharing the plate 20 (or the waveguide) with other devices and for which separate information feedback is desired for each of the devices. The light source 55 is, for example, formed from one or more light-emitting diodes that are positioned on the printed circuit board 25 close to the sensor 17 or 35. The wall 28 may separate the light source 55 from the sensor. Alternatively or additionally, as for the separation between the backlighting and the optical encoding function, the sensor may be insensitive to the light that is emitted by the light source 55. Likewise, it is possible to differentiate the color of the backlighting from that of the information feedback. For example, the sensor or sensors 17 and 35 may operate in the infrared, the backlighting in the red and the information feedback in the green. It is possible to make provision for a plurality of different colors in order to feedback various items of information.

The invention claimed is:

1. An optical encoder comprising
a movable part bearing a scattering zone and an absorbing zone,
a light emitter that is positioned so as to emit light radiation in the direction of the movable part,
a sensor that is sensitive to the light emitted by the emitter, the sensor being positioned so as to detect light radiation that is reflected by the scattering zone, the movement of the movable part making it possible to place either the scattering zone or the absorbing zone on an optical path between the emitter and the sensor,
an optical waveguide having a first and a second external face, the light emitter being positioned so as to emit the light radiation into the waveguide, the light radiation being able to totally reflect between the first face and the second face, the optical waveguide being positioned between the movable part and the sensor, the movable part being positioned on the side of the first face, the sensor being positioned on the side of the second face, the first face comprising a first altered zone that is configured so that a portion of the light radiation exits the waveguide via the altered zone in the direction of the movable part, the optical waveguide being passed through by the light radiation that is reflected by the scattering zone.

2. The optical encoder according to claim 1, further comprising an electrical shielding screen that is positioned on the surface of the plate, the electrical shielding screen being transparent to the light radiation.

3. The optical encoder according to claim 1, further comprising at least one shield making it possible to protect the sensor from stray radiation not originating from the movable part.

4. The optical encoder according to claim 3, wherein the shield is formed by a mask that is opaque to the light radiation, the mask covering the plate with the exception of a hole made facing the sensor.

5. The optical encoder according to claim 1, wherein the altered zone comprises means for focusing the light radiation extracted via the face around a direction perpendicular to the plane of the waveguide.

6. The optical encoder according to claim 1, wherein the altered zone is formed by local geometric splitting of the first face, the local geometric split disrupting the total reflection of the light radiation in the waveguide.

7. The optical encoder according to claim 1, wherein the first face of the waveguide comprises a second altered zone that is separate from the first altered zone so that a portion of the light radiation exits the waveguide via the second altered zone so as to illuminate a legend that is associated with the movable part.

8. The optical encoder according to claim 7, wherein the emitter is called the first emitter, the encoder further comprising a second light emitter that is positioned so as to emit light radiation into the waveguide, the first and the second light emitters each emitting in one wavelength band, the two bands being separate, the sensor being configured to detect radiation in the wavelength band of the first emitter, the wavelength band of the second emitter being used to exit the waveguide via the second altered zone.

9. The optical encoder according to claim 1, further comprising a second sensor, the second sensor being capable of detecting light radiation that is reflected by one of the zones of the movable part, the second sensor being positioned so that when one of the two sensors receives light radiation that is reflected by a scattering zone, the other of the two sensors is facing an absorbing zone and vice versa.

10. The optical encoder according to claim 1, further comprising a plurality of sensors that are positioned so that all of them are able to receive radiation that is reflected by one and the same scattering zone.

11. The optical encoder according to claim 1, further comprising a light source that is controlled by a signal issued by the sensor and allowing information to be fedback to the user depending on movements of the movable part.

12. The optical encoder according to claim 11, wherein the light source allowing the information to be fedback is positioned so as to emit light perpendicularly to the plate while passing therethrough.

13. The optical encoder according to claim 11, wherein the light source allowing the information to be fedback emits in a wavelength band that is separate from that for which the sensor is configured.

* * * * *